United States Patent
Viala et al.

(10) Patent No.: US 9,950,801 B2
(45) Date of Patent: Apr. 24, 2018

(54) AIRCRAFT WITH ELECTRIC PROPULSION MEANS

(71) Applicant: AIRBUS, Blagnac (FR)

(72) Inventors: Stéphane Viala, Cornebarrieu (FR); Jason Zaneboni, Blagnac (FR); Bruno Saint-Jalmes, Toulouse (FR)

(73) Assignee: AIRBUS SAS, Blagnac (FR)

( * ) Notice: Subject to any disclaimer, the term of this patent is extended or adjusted under 35 U.S.C. 154(b) by 0 days.

(21) Appl. No.: 14/304,864

(22) Filed: Jun. 13, 2014

(65) Prior Publication Data
US 2014/0367510 A1    Dec. 18, 2014

(30) Foreign Application Priority Data
Jun. 14, 2013   (FR) ...................... 13 55610

(51) Int. Cl.
| | | |
|---|---|---|
| *B64D 27/24* | (2006.01) | |
| *B64D 27/02* | (2006.01) | |
| *B64D 29/04* | (2006.01) | |
| *B64C 1/26* | (2006.01) | |

(52) U.S. Cl.
CPC ............. *B64D 27/24* (2013.01); *B64C 1/26* (2013.01); *B64D 27/02* (2013.01); *B64D 29/04* (2013.01); *B64D 2027/026* (2013.01); *Y02T 50/64* (2013.01)

(58) Field of Classification Search
CPC ........ B64D 27/02; B64D 27/06; B64D 27/08; B64D 27/12; B64D 27/14; B64D 27/18; B64D 27/20; B64D 27/24; B64D 2027/026; B64D 29/00; B64D 29/02; B64D 29/04
See application file for complete search history.

(56) References Cited

U.S. PATENT DOCUMENTS

| 1,851,857 | A | | 3/1932 | Manley | |
|---|---|---|---|---|---|
| 2,462,201 | A | * | 2/1949 | Kilgore et al. ................. | 244/60 |
| 3,397,854 | A | * | 8/1968 | Reyle .............................. | 244/55 |
| 3,447,761 | A | * | 6/1969 | Whitener et al. ............... | 244/15 |
| 3,936,017 | A | * | 2/1976 | Blythe .................... | B64D 27/20 |
| | | | | | 244/55 |
| 4,605,185 | A | * | 8/1986 | Reyes ............................ | 244/60 |
| 5,355,668 | A | * | 10/1994 | Weil et al. ..................... | 60/777 |
| 7,555,893 | B2 | * | 7/2009 | Okai et al. ..................... | 60/228 |
| 7,578,369 | B2 | * | 8/2009 | Francisco ................ | F02C 7/24 |
| | | | | | 244/1 N |
| 7,926,760 | B2 | * | 4/2011 | Gall ...................... | B64D 27/14 |
| | | | | | 244/1 N |

(Continued)

FOREIGN PATENT DOCUMENTS

| EP | 2581308 A2 | 4/2013 |
|---|---|---|
| FR | 2943039 A1 | 9/2010 |

OTHER PUBLICATIONS

French Search Report dated Feb. 24, 2014.

*Primary Examiner* — Richard R Green
(74) *Attorney, Agent, or Firm* — Greer Burns & Crain, Ltd.

(57) ABSTRACT

An aircraft with an electric propulsion arrangement which includes a fuselage, a wing system attached to the fuselage, and a tail unit attached to a rear part of the fuselage. The electric propulsion arrangement is arranged on each side of the fuselage, an electrical energy generator and electricity storage and supply devices are arranged substantially along a longitudinal axis of symmetry of the fuselage. The aircraft thus incorporates a hybrid motorization.

22 Claims, 3 Drawing Sheets

(56) References Cited

U.S. PATENT DOCUMENTS

| | | |
|---|---|---|
| 9,096,312 B2* | 8/2015 | Moxon |
| 2012/0138736 A1* | 6/2012 | Cazals et al. .................. 244/54 |
| 2013/0062455 A1 | 3/2013 | Lugg et al. |
| 2013/0094963 A1* | 4/2013 | Rolt ....................... B64D 27/24 |
| | | 416/1 |
| 2013/0099065 A1* | 4/2013 | Stuhlberger ..................... 244/7 |
| 2014/0038770 A1* | 2/2014 | Goi ........................... F02C 7/32 |
| | | 476/8 |
| 2014/0179535 A1* | 6/2014 | Stuckl .................... B64D 27/24 |
| | | 505/163 |

* cited by examiner

AIRCRAFT WITH ELECTRIC PROPULSION MEANS

CROSS-REFERENCES TO RELATED APPLICATIONS

This application claims the benefit of French patent application No. 1355610 filed on Jun. 14, 2013, the entire disclosures of which are incorporated herein by way of reference.

BACKGROUND OF THE INVENTION

The present invention relates to an aircraft intended for the transport of a payload, and for example a civil aircraft intended either for the transport of passengers, or for the transport of freight.

Conventionally, an aircraft comprises a fuselage, at the front of which a cockpit is situated.

Behind the cockpit, the fuselage comprises a central part intended for the transport of a payload. Typically, a cabin for receiving passengers is situated in the central part of the fuselage, optionally with a hold for transporting freight. This central part can also be fitted out for receiving freight only.

A wing system, the position and shape of which depend on the design of the aircraft, is attached to the fuselage.

A tail unit is also attached to a rear part of the fuselage. This tail unit is conventionally associated with a tail fin.

The rear part of the fuselage is generally dedicated to the housing of technical compartments.

The aircraft generally comprises engines, for example two engines fixed under the wing system of the aircraft.

These engines constitute the means of propulsion of the aircraft and are typically combustion engines supplied with fuel stored in a tank in the aircraft.

A purpose of the present invention is to provide an aircraft making it possible to reduce the consumption of fuel and the emissions of carbon dioxide and other pollutants originating from the combustion.

SUMMARY OF THE INVENTION

To this end, the present invention proposes an aircraft comprising a fuselage, a wing system attached to the fuselage, and a tail unit attached to a rear part of the fuselage.

According to the invention, the aircraft comprises electric propulsion means arranged on each side of the fuselage, an electrical energy generator and electricity storage and supply means, the electrical energy generator and the electricity storage and supply means being arranged substantially along a longitudinal axis of symmetry of the fuselage.

Thus, the aircraft incorporates a hybrid motorization combining electric propulsion means and an electrical energy generator, which can typically be formed by a heat engine consuming fuel, such as a gas turbine or combustion turbine.

The incorporation of a hybrid motorization in the aircraft makes it possible to reduce the aircraft's fuel consumption, and thus the emissions of carbon dioxide and other pollutants originating from conventional combustion.

The arrangement of the electrical energy generator and electricity storage and supply means along the longitudinal axis of symmetry of the fuselage, and the distribution of the electric propulsion means on each side of the fuselage makes it possible to obtain a balanced distribution of the aircraft's propulsion system and a good distribution of the weight in the aircraft.

According to an embodiment, the electric propulsion means comprise at least two electric motors with fans arranged on the wing system on each side of the fuselage respectively.

The front edge of the wing root of the wing system is preferably arranged at the rear of the fuselage, at a distance from the front end of the fuselage substantially comprised between 60 and 70% of the length of the fuselage.

In an advantageous embodiment, the tail unit comprises a profile extended on each side by stabilizing surfaces, the electrical energy generator being incorporated in the rear part of the fuselage.

Advantageously, the fuselage comprises on its upper surface an air guide for the electrical energy generator.

In an advantageous embodiment, the aircraft comprises a fairing extending from an upper surface of the fuselage above said electric propulsion means, the electric propulsion means being housed between the fairing, the fuselage and the wing system.

In practice, the fairing comprises a central portion extending from the upper surface of the fuselage, above the electric propulsion means arranged on the wing system, said central portion of fairing comprising on each side of the fuselage respectively a substantially vertical lateral edge firmly fixed to the wing system.

Advantageously, the fairing comprises a rear portion extending in the direction of a rear end of the fuselage, the width of said rear portion of the fairing decreasing from the central portion of the fairing to the rear end of the fuselage.

In an embodiment, the electrical energy generator cooperates with an exhaust gas duct, the internal surface of said exhaust gas duct having an active exhaust gas treatment surface.

The exhaust gas duct advantageously has a shape widening from a gas outlet of the electrical energy generator towards the rear end of the fuselage.

In an embodiment, the aircraft also comprises on each side of the fuselage, a joining surface projecting from the fuselage extending between the rear edge of the wing root of the wing system and the tail unit.

The joining surface advantageously extends substantially in the same plane as the wing system.

In an embodiment, the electricity storage and supply means are arranged close to the center of gravity of the aircraft equipped with the electric propulsion means and electrical energy generator.

In an embodiment, the electricity storage and supply means fit the internal shape of the fuselage.

In practice, the aircraft comprises several electric motors with fans arranged symmetrically on the wing system on each side of the fuselage.

In an embodiment, the fuselage comprises a front part having a width, measured along the pitch axis, and a height, measured along the yaw axis, increasing in the longitudinal direction of the aircraft starting from the front end of the fuselage.

In an embodiment, the fuselage comprises a central part intended for the transport of a payload and a rear part in which the electrical energy generator is arranged, the width of the fuselage decreasing in the central part and the rear part to the rear end of the fuselage.

In practice, the electricity storage and supply means supply the electric propulsion means with electrical energy.

BRIEF DESCRIPTION OF THE DRAWINGS

Further features and advantages of the invention will become apparent from the following description.

In the attached drawings, given as non-limitative examples.

DETAILED DESCRIPTION OF THE PREFERRED EMBODIMENTS

In general terms, according to a particular embodiment, the invention relates to a centralized loading system making it possible, before performing a loading operation, to verify required initial conditions, suggest to an operative operations that must be carried out before and/or after loading, carry out said actions automatically (after or without confirmation from an operative depending on the configuration), by using agents acting on third party equipment (in the absence of an agent, the loading system can show at the appropriate time the instructions necessary for an operative to carry out the action) and resolve software module loading constraints by indicating to an operative, if necessary, the missing software modules.

Throughout the following description, the terms "front" and "rear" refer to the aircraft and to its direction of movement in flight.

The concepts of relative positions, lower and upper, apply for example when the aircraft is in cruising flight or when it is on the ground.

Moreover, the length of the aircraft is defined along a roll axis, also called longitudinal axis X, the width of the aircraft along the pitch axis Y, and the height of the aircraft along the yaw axis Z of the aircraft.

By way of non-limitative example, the aircraft described hereafter is a transonic aircraft intended for the transport of passengers and, for example, in certain interior fitting configurations allowing the transport of at least one hundred passengers.

However, the present invention is not limited to such an aircraft and can also relate to aircraft most commonly called "cargo planes".

As clearly illustrated in the figures, the aircraft 10 comprises a fuselage 11 and a wing system 12 attached to the fuselage 11. The wing system 12 comprises two wings extending symmetrically on either side of the fuselage 11.

A tail unit 13 is attached to the fuselage 11.

In this embodiment, the tail unit 13 has a profile 13a extended on each side by stabilizing surfaces 13b.

More particularly, the profile 13a extends here on either side of the fuselage 11 and has a shape slightly curved upwards, which is extended on each side by the stabilizing surfaces 13b.

The stabilizing surfaces 13b are inclined upwards from the profile 13a, or even substantially vertical depending on the embodiments of the tail unit 13.

The stabilizing surfaces 13b, which are large in size, make it possible to produce an aircraft without a central tail fin while coupling the roll and pitch axes.

Thus, the tail unit 13 overall has a U-shape constituted by the profile 13a and the stabilizing surfaces 13b extending upwards from the aircraft 10.

Figure 5:
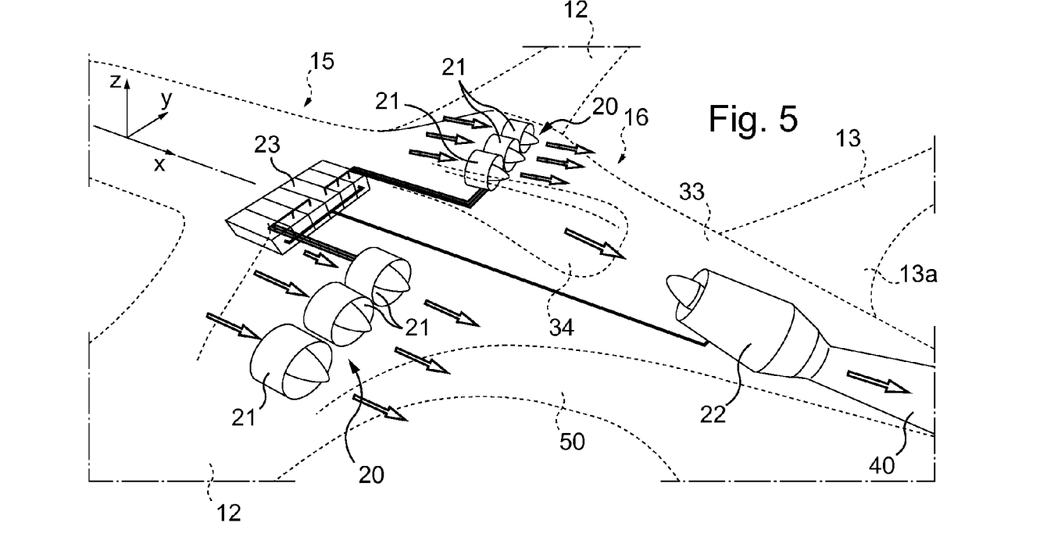
FIG. 5 is a diagrammatic partial view of the aircraft in FIG. 1, illustrating the arrangement of the components of the propulsion system.

As clearly illustrated in FIG. 5, the fuselage 11 comprises a front part 14, a central part 15 and a rear part 16.

The front part 14 of the fuselage 11 is here intended to receive a cockpit inside which a flight deck is situated.

The latter comprises in particular all the controls for piloting the aircraft, control screens, means of communication etc.

Of course, the cockpit can be arranged elsewhere than in the front part 14 of the fuselage. The front part 14 of the fuselage can then be used for the transport of a payload.

The central part 15 of the fuselage 11 is intended for the transport of a payload.

In the embodiment illustrated, the payload is essentially made up of passengers.

To this end, windows 17 and one or more access doors 18 are provided on the central part 15 of the fuselage 11.

A hold for receiving the passengers' baggage and optionally other goods is arranged in the central part 15 of the fuselage, under the cabin intended for receiving the passengers.

Such a configuration is completely standard in an aircraft and need not be described in detail here.

In this embodiment, the front part 14 of the fuselage 11 has a width measured along the pitch axis Y, and a height measured along the yaw axis Z, increasing in the longitudinal direction X of the aircraft 10 starting from the front end 11b of the fuselage 11.

Thus, the front part 14 has a width and height increasing in the longitudinal direction X starting from the nose 10b of the aircraft 10.

The width and height increase continuously starting from the nose 10b of the aircraft 10.

The front part 14 thus has an original domed shape overall.

In particular, there is no break point in the front part 14 of the fuselage 11, in particular at the level of the windscreens 19 of the cockpit.

The front part 14 thus has a profile ensuring better air penetration and optimizing the aerodynamics of the aircraft. This front part 14 of the fuselage 11 can thus contribute to part of the overall aerodynamic lift.

Of course, the particular shape of the front part of the fuselage 11 is in no way limitative, the other features of the embodiment of the invention described being able to be implemented in an aircraft having a front part of the fuselage of a different shape.

Moreover, the width of the fuselage 11 decreases from the front part 14 to the rear end 11a of the fuselage 11.

Thus, the central part 15 and the rear part 16 of the fuselage 11 have a width which decreases continuously to the rear end 11a of the fuselage 11.

Moreover, in the central part 15 of the fuselage 11, the height, measured along the yaw axis Z, remains substantially constant. The central part 15 of the fuselage 11 has a great length in the longitudinal direction X of the aircraft 10, creating a large passenger area and offering numerous possibilities in terms of cabin configuration.

The height of the rear part 16 on the other hand, measured along the yaw axis Z, decreases from the central part 15 to the rear end 11a of the fuselage 11.

Thus, the width and the height of the rear part 16 decrease continuously to the rear end 11a of the fuselage 11.

Of course, the particular shape of the central part and rear part of the fuselage is in no way limitative, the other features of the embodiment of the invention described being able to be implemented in an aircraft having a central part and/or rear part of the fuselage of a different shape.

As clearly illustrated in the figures, in the embodiment described, the rear part 16 of the fuselage is intended to at least partially incorporate the aircraft's propulsion system 10 which will now be described.

In principle, the aircraft's propulsion system 10 is a hybrid motorization combining electric propulsion means 20, an electrical energy generator 22 and electricity storage and supply means 23.

The electrical energy generator 22 is preferably supplied by a source of liquid or gaseous energy, of the fuel type.

By way of non-limitative example, the electrical energy generator is a gas turbine using as fuel a propellant on board the aircraft 10, typically kerosene stored in a tank in the aircraft 10.

The electrical energy generator 22 is dedicated solely to the production of electricity and produces no useful thrust in the propulsion system of the aircraft.

The electrical energy generator 22 is suitable for supplying the electricity storage and supply means 23.

The electricity storage and supply means 23 are for example constituted by a battery suitable for storing the electrical energy originating from the electrical energy generator 22.

The battery is used to supply electric current to the electric propulsion means 20.

It must also, preferably, ensure an adequate electricity supply to the electric propulsion means 20 in the event of a failure of the electrical energy generator 22.

As clearly illustrated in the figures, electric propulsion means 20 are arranged on each side of the fuselage 11.

In this embodiment example, the electric propulsion means 20 comprise electric motors with fans 21 arranged on each side of the fuselage 11.

Figures 3, 4:
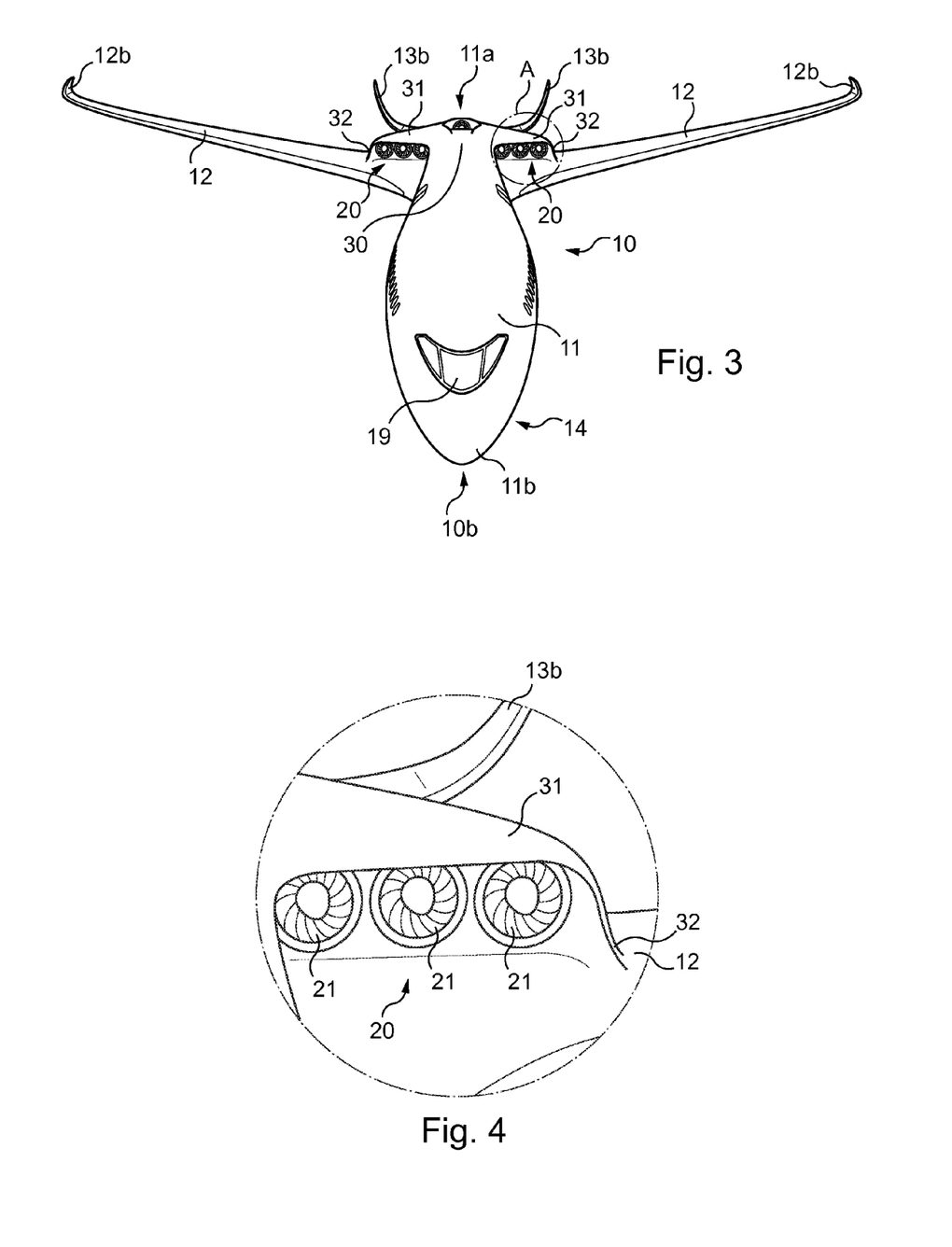
FIG. 3 is a perspective front view of the aircraft in FIG. 1.
FIG. 4 is an enlarged view of detail A in FIG. 3.

As clearly illustrated in particular in FIGS. 3 and 4, the electric propulsion means 20 comprise several electric motors with fans 21 arranged symmetrically on each side of the fuselage 11.

In this embodiment, three electric motors with fans 21 are arranged on each side of the fuselage 11.

Of course, the number of electric motors with fans 21 is in no way limitative.

In particular, the electric propulsion means can comprise one or two electric motors with fans arranged on each side of the fuselage 11, or even a number greater than three.

The use of several electric motors with fans 21 instead of a single one, on each side of the fuselage 11, makes it possible to use small electric motors with fans, thus facilitating their incorporation in the overall architecture of the aircraft.

The use of several small electric motors with fans also makes it possible to reduce the noise emitted by the propulsion system.

In the embodiment illustrated, and non-limitatively, the electric propulsion means 20 are arranged on the wing system 12 of the aircraft.

Thus, as clearly illustrated in FIG. 5, the electric motors with fans 21 are arranged on each wing of the wing system 12, on each side of the fuselage 11 respectively.

Moreover, the electrical energy generator 22 and the electricity storage and supply means 23 are arranged substantially along the longitudinal axis of symmetry X of the fuselage 11.

The electrical energy generator 22 is moreover incorporated in the rear part 16 of the fuselage 11.

The electricity storage and supply means 23 are arranged close to the center of gravity of the aircraft 10 equipped with the electric propulsion means 20 and the electrical energy generator 22.

The positioning of the electricity storage and supply means 23, the electrical energy generator 22 and the electric propulsion means 20 makes it possible to obtain a balanced distribution of the components of the aircraft's propulsion system.

For example, in the embodiment as illustrated in particular in FIG. 5, the electricity storage and supply means 23 are arranged in the rear part 16 of the fuselage 11, at the level of the wing root of the wing system 12 and in front of the electric propulsion means 20 and the main landing gear (not shown) of the aircraft 10.

A good weight distribution is thus ensured for balancing the aircraft.

Preferably, the electricity storage and supply means 23 are arranged inside the fuselage 11, to the rear of the central part 15 forming the cabin, and have a shape which fits the internal shape of the fuselage 11.

Thus, the electricity storage and supply means 23 also ensure a structural function of the aircraft 10.

It will thus be noted that the electricity storage and supply means 23 perform a double function: an electricity storage and supply function, based on the electrical energy provided by the electrical energy generator 22, and a function of distribution of the loads in the aircraft, in particular allowing a balanced distribution of the different components of the aircraft propulsion system.

Moreover, in this embodiment, the electrical energy generator 22 is incorporated in the rear part 16 of the fuselage 11.

The U-shape of the tail unit 13 attached to the rear part 16 of the fuselage 11 is particularly well suited to the arrangement of the electrical energy generator 22 in the rear part 16 of the fuselage 11.

Apart from a good distribution of the loads in the aircraft, the relative arrangement of the different components of the propulsion system is aimed at facilitating the electrical connection of the electrical energy generator 22, electricity storage and supply means 23 and electric propulsion means 20.

In particular, the length of cabling necessary is limited by arranging the electrical energy generator 22, the electricity storage and supply means 23 and the electric propulsion means 20 close to each other.

Moreover, in this embodiment, the wing system 12, intended here to support the electric propulsion means 20, is arranged at the level of the rear part 16 of the fuselage 11.

According to a non-limitative embodiment example, the front edge 12a of the wing root of the wing system 12 is arranged to the rear of the fuselage 11, at a distance from the front end 11b of the fuselage 11 substantially comprised between 60 and 70% of the length of the fuselage 11.

Non-limitatively, in the embodiment described, in which the width of the fuselage 11 decreases from the front part 14 to the rear end 11a of the fuselage 11, the attachment of the wing system 12 in the rear part 16 of the fuselage 11 makes it possible to attach the wing system 12 to a narrow section of fuselage, thus making it possible to offer a longer wing system 12, in accordance with the area rule.

Here, moreover, by way of non-limitative example, the wing system 12 has a vertical end fin 12b at the end of each wing.

Moreover, in the embodiment shown in the figures, the wing system 12 is sited low with respect to the fuselage 11.

As clearly illustrated in particular in FIGS. 3 and 4, in this embodiment allowing the incorporation of a hybrid motorization system, the aircraft 11 comprises a fairing 30 extending from an upper surface of the fuselage 11 above the electric propulsion means 20.

Thus, the electric motors with fans 21 are here encased in one and the same fairing 30.

The fairing 30 extends the upper surface of the fuselage 11 towards the outside of the aircraft, on either side of the fuselage 11, above the electric propulsion means 20 and to the rear end 11a of the fuselage 11.

Thus, the electric propulsion means 20 are completely surrounded by the fairing 30, the fuselage 11 and the wing system 12.

More precisely, the fairing 30 here comprises a central portion 31 extending from the upper surface of the fuselage 11 above the electric propulsion means 20 arranged on the wing system 12.

The central portion 31 of fairing 30 comprises in particular, on each side of the fuselage 11 respectively, a lateral edge 32 that is substantially vertical and firmly fixed to the wing system 12.

Thus, the fairing 30 has a width which increases starting from the fuselage 11 in such a way that the central portion 31 of fairing 30 is extended on each side of the fuselage 11, above the front end of the electric fan engine 21 that is placed outermost on the wing system 12.

The central portion 31 of fairing 30 then retains a constant width above the electric motors with fans 21. The width of the fairing 30 then decreases from the rear end of the electric motors with fans 21 to the rear end 11a of the fuselage 11.

By means of the lateral edges 32 firmly fixed to the wing system 12, the fairing 30 joins the wing system 12, encasing all of the electric propulsion means 20, here all of the electric motors with fans 21 arranged on each side of the fuselage 11.

The fairing 30 also comprises a rear portion 33 extending to the rear end 11a of the fuselage 11, the width of the rear portion 33 of the fairing 30 decreasing from the central portion 31 of the fairing 30 to the rear end 11a of the fuselage 11.

The rear portion 33 of the fairing 30 thus decreases in width at the tail unit 13, and more precisely to the tail of the aircraft 10, where it is integral with the rear end 11a of the fuselage 11.

Figure 1:
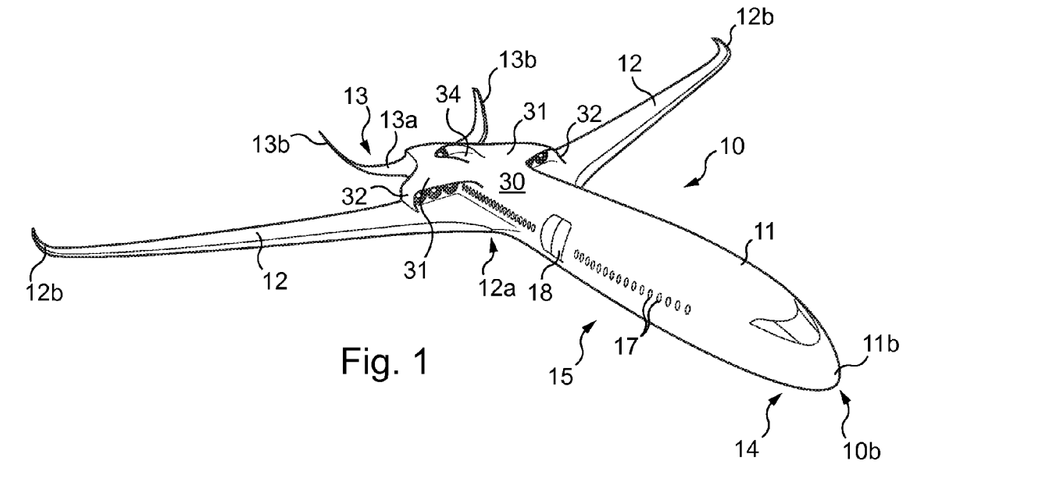
FIG. 1 is a perspective front side view of an aircraft according to an embodiment of the invention.
Figure 2:
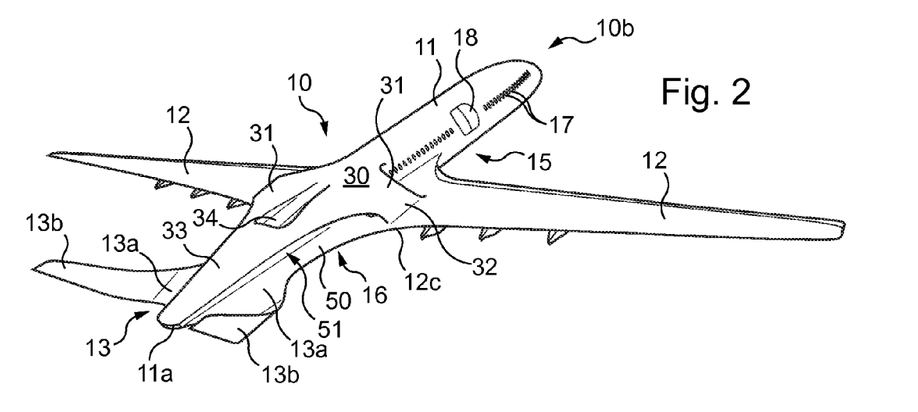
FIG. 2 is a perspective rear side view of the aircraft in FIG. 1.

Thus, as clearly illustrated in FIG. 2, in this embodiment, the fairing 30 in top view has substantially the shape of a cross.

As clearly illustrated in FIGS. 2 and 3, the fuselage 11 comprises, on its upper surface, an air guide 34 for the electrical energy generator 22.

By way of non-limitative example, this air guide 34 is funnel-shaped and constitutes a shallow air intake, also referred to as a scoop 34 below.

The air intake can have an NACA airfoil recess, by way of non-limitative example, which can maximize the compression upstream of the electrical energy generator 20 and complement the scoop 34. The scoop constitutes a dynamic air intake with surfaces guiding air to the electrical energy generator 22.

The operating principle of an NACA airfoil air intake is the creation of inward negative pressure in the fuselage 11 to draw in air in the direction of the electrical energy generator 22 due to the generation of two vortices on the sides of the recess.

Of course, the NACA-type air intake is only one embodiment example of an air intake in the fuselage and, in terms of efficiency, complements the dynamic air intake of the scoop 34 type.

More generally, the aircraft 10 comprises one or more air intakes close to the fuselage 11 in order to absorb the boundary layer of air propagating from the nose 10a of the aircraft 10, and thus reduce the pressure drag of the aircraft.

The air guide 34 makes it possible to ensure the air supply to the electrical energy generator 22, typically constituted by a combustion gas turbine.

As illustrated in FIG. 5, the electrical energy generator 22 is arranged substantially along an oblique axis, forming an angle with the longitudinal axis X in a vertical longitudinal plane of the aircraft 10.

This inclined arrangement of the electrical energy generator 22 makes it possible to improve the air intake by minimizing the pressure losses that would result from a more pronounced curve.

In this embodiment, and by way of example, the electrical energy generator 22 cooperates with an exhaust gas duct 40.

It is possible to provide a significant distance between the rear end of the electrical energy generator 22, from which the exhaust gases are emitted, and the rear end 11a of the fuselage 11.

Typically, a length of approximately four meters can be provided.

The exhaust gas duct 40 can thus have a great length in order to form a large exhaust system volume.

The exhaust gas duct 40 can have a shape widening from a gas outlet of the electrical energy generator 22 to the rear end 11a of the fuselage 11.

In particular, the internal surface of the exhaust gas duct 40 can have an active exhaust gas treatment surface in order to reduce the emission of pollutants into the atmosphere.

The active surface of the exhaust gas duct 40 interacts with the exhaust gases in order to treat them.

By way of example, this active surface can be produced by catalytic deposition, similar to those used in the exhaust pipes of motor vehicles.

Such an active surface is suitable for directly treating exhaust gases leaving the electrical energy generator 22, and in particular the gases originating from turbine combustion.

The exhaust gas duct 40 here has a flattened conical shape, guiding the exhaust gases from the electrical energy generator 22 to the rear end 11a of the fuselage 11 which has a gas exhaust vent.

The gas outlet section must also take into account the expansion of the heated air leaving the electrical energy generator 22.

Moreover, in this embodiment combined with a rear part 16 of the fuselage 11 which has a width and a height decreasing in the direction of the rear end 11a of the fuselage 11, the structure of the fuselage 11 has the advantage of reducing the drag of the aircraft 10.

The conical shape of the exhaust gas duct 40 also has the objective of guiding the exhaust gas stream leaving the fuselage 11.

It will be noted that the treatment of the exhaust gases originating from the aircraft 10 is greatly facilitated by the utilization of a single turbine, and makes it possible to arrange a particle filter locally in the aircraft 10.

The use of a single turbine also makes it possible to reduce the noise of the propulsion system. The surface of the exhaust gas duct 40 can also be provided with an acoustically treated surface and thus limit acoustic emissions.

In the embodiment illustrated, the aircraft 10 also comprises on each side of the fuselage 11, a joining surface 50 projecting from the fuselage 11.

The tail unit 13 and the wing system 12 are connected by the joining surface 50.

As clearly illustrated in particular in FIG. 2, this joining surface 50 extends between the rear edge 12c of the wing root of the wing system 12 and the tail unit 13. More particularly, the joining surface 50 is connected to the tail unit 13 at the level of the profile 13a.

In an advantageous embodiment, the joining surface 50 extends substantially in the same plane as the wing system 12, thus forming an extension of the wing system 12 to the tail unit 13.

The presence of the joining surface 50 is particularly advantageous when it is combined with a fuselage 11 the width of which decreases from the front part 14 to the rear end 11a of the fuselage 11.

The rear part 16 of the fuselage 11, with a shorter diameter than the front part 14, is thus supported by this joining surface 50.

Moreover, in combination with the fairing 30 described previously, a channel 51 is formed between the fairing 30 and the joining surface 50. More particularly, the channel 51 is here formed between the rear portion 33 of the fairing 30, the U-shaped tail unit 13 and the joining surface 50.

The channel 51 is suitable for guiding streams of air to the rear end of the aircraft 10 at which the exhaust gases from the electrical energy generator 22 are ejected.

All of these structures thus constitute novel enclosing and lifting surfaces around the fuselage 11 of the aircraft, making it possible to provide the aircraft with an aerodynamic design reducing the drag of the aircraft and improving the lift.

Moreover, the wing system 12, the joining surface 50 and the U-shaped tail unit 13 form a masking surface making it possible to contain the noise cone.

This configuration thus makes it possible to minimize the nuisance of noise directed towards the ground and to limit noise emissions to the ground in areas flown over by the aircraft 10.

Moreover, in the embodiment described, the electric propulsion means 20 are arranged at the level of the rear part 16 of the fuselage 11 and not that of the passengers in the central part 15. The noises and noise pollution inside the cabin of the aircraft 10 are thus limited.

Moreover, the rear part 16 of the fuselage 11 is usually a dead space, used only for technical compartments.

By contrast, in the embodiment example described previously, the rear part 16 of the fuselage is used for housing the propulsion system of the aircraft 10.

Figure 6:
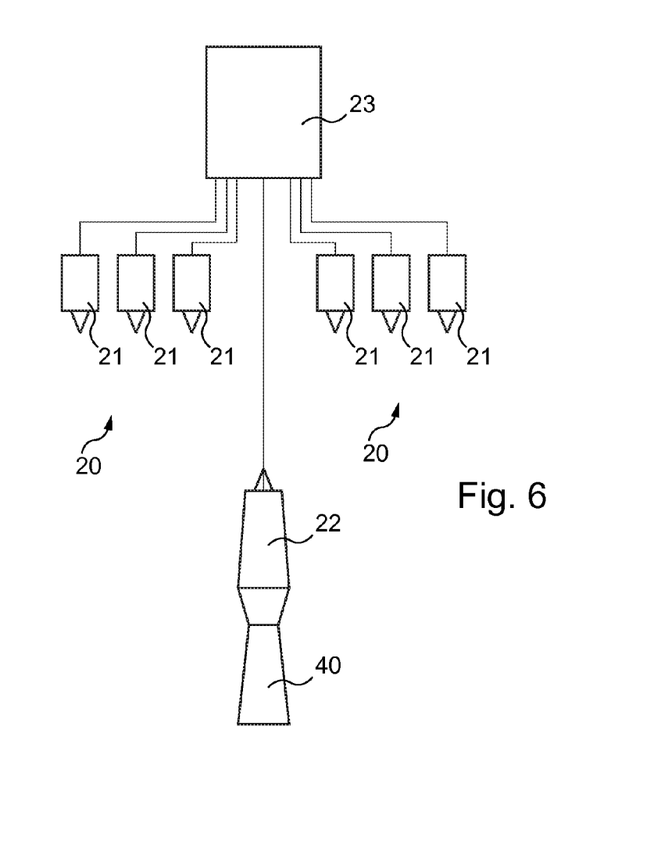
FIG. 6 is a diagram illustrating the connections of the propulsion system of the aircraft in FIG. 1.

FIG. 6 diagrammatically illustrates the propulsion system utilizing a hybrid motorization such as can be incorporated in the aircraft described according to the previous embodiment.

In this example, the electrical energy generator is a turbine 22 producing, from the combustion of a fuel, electricity charging the electricity storage and supply means, here constituted by a battery 23.

The battery 23 is then directly connected to the electric propulsion means 20, here made up of six electric motors with fans 21 arranged half on each side of the fuselage 11.

The separation in the propulsion system of the turbine 22, producing only the electrical energy, and electric propulsion means 20, generating the thrust necessary to move the aircraft 10, makes it possible to reduce the size of the turbine 22 and to optimize it for a single operating point aimed at producing electricity.

Thus, the turbine 22 provides the electrical energy necessary to charge the battery 23, in particular when the aircraft 10 is in cruising mode.

In particular, during take-off and climbing of the aircraft 10, the additional thrust required will be obtained by means of the electrical energy stored in the battery 23.

It will also be noted that the battery 23 can be useful in the event of a failure of the turbine 22.

Of course, the present invention is not limited to the embodiment examples described above.

Thus, the arrangement of the different components of the aircraft's propulsion system is in no way limitative, the example locations described previously being able to be implemented in isolation or in combination with each other.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft comprising:
    a fuselage,
    a wing system attached to the fuselage,
    a tail unit attached to a rear part of the fuselage,
    electric propulsion means arranged on each side of the fuselage,
    a single electrical energy generator, wherein the single electrical energy generator is dedicated to the production of electricity and produces no useful thrust for the aircraft, and
    electricity storage and supply means, wherein the electricity storage and supply means is configured and arranged for storing the electrical energy originating from the single electrical energy generator and for supplying all of the electric current to the electric propulsion means, wherein the single electrical energy generator is the only electrical energy generator for supplying electric current to the electricity storage and supply means,
    wherein the single electrical energy generator and the electricity storage and supply means are arranged substantially along a longitudinal axis of symmetry of the fuselage, and
    wherein the single electrical energy generator is positioned in the rear part of the fuselage, and
    further wherein the electricity storage and supply means are arranged in front of the electric propulsion means.

2. The aircraft according to claim 1, wherein the electric propulsion means comprise at least two electric motors with fans arranged on the wing system on each side of the fuselage, respectively.

3. The aircraft according to claim 1,
    wherein a front edge of a wing root of the wing system is arranged at the rear of the fuselage, at a distance from a front end of the fuselage substantially comprised between 60 and 70% of the length of the fuselage.

4. The aircraft according to claim 3, wherein the wing system comprises two wings each extending symmetrically from one side of the fuselage, and further wherein the wings are swept backwardly.

5. The aircraft according to claim 1,
wherein the tail unit comprises a profile extended on each side by upwardly extending stabilizing surfaces, and wherein the single electrical energy generator is incorporated in the rear part of the fuselage.

6. The aircraft according to claim 1, wherein the fuselage comprises on its upper surface an air guide for the single electrical energy generator.

7. The aircraft according to claim 1,
further comprising a fairing extending from an upper surface of the fuselage above said electric propulsion means, wherein the fairing extends to a rear end of the fuselage, and further wherein the electric propulsion means is housed between the fairing, the fuselage and the wing system.

8. The aircraft according to claim 7, wherein the fairing comprises a central portion extending from an upper surface of the fuselage, above the electric propulsion means arranged on the wing system, said central portion of fairing comprising on each side of the fuselage respectively a lateral edge that is substantially vertical and firmly fixed to the wing system.

9. The aircraft according to claim 7, wherein the fairing comprises a rear portion extending in a direction of a rear end of the fuselage, a width of said rear portion of the fairing decreasing from a central portion of the fairing to the rear end of the fuselage.

10. The aircraft according to claim 1, wherein the single electrical energy generator cooperates with an exhaust gas duct, an internal surface of said exhaust gas duct having an active exhaust gas treatment surface.

11. The aircraft according to claim 10, wherein the exhaust gas duct has a shape widening from a gas outlet of the single electrical energy generator towards the rear end of the fuselage, whereby a distance between interior side edges of the exhaust gas duct increases toward the rear end of the fuselage.

12. The aircraft according to claim 1, further comprising on each side of the fuselage, a joining surface projecting from the fuselage extending between a rear edge of a wing root of the wing system and the tail unit.

13. The aircraft according to claim 12, wherein said joining surface extends substantially in a same plane as the wing system.

14. The aircraft according to claim 1, wherein the electricity storage and supply means are arranged close to a center of gravity of the aircraft equipped with the electric propulsion means and the single electrical energy generator.

15. The aircraft according to claim 1, wherein the electricity storage and supply means fit an internal shape of the fuselage.

16. The aircraft according to claim 1, further comprising several electric motors with fans arranged symmetrically on the wing system on each side of the fuselage.

17. The aircraft according to claim 1, wherein the fuselage comprises a front part having a width measured along a pitch axis, and a height measured along a yaw axis, and further wherein both the width and the height, in the front part, increase in the longitudinal direction of the aircraft starting from a front end of the fuselage.

18. The aircraft according to claim 17, wherein the fuselage comprises a central part arranged to receive a payload and a rear part in which the single electrical energy generator is arranged, a width of said fuselage decreasing in the central part and the rear part to the rear end of the fuselage.

19. The aircraft according to claim 1, wherein the single electrical energy generator is arranged substantially along an axis that is oblique with respect to an axis X that extends along the longitudinal direction of the fuselage.

20. The aircraft according to claim 1, wherein the single electrical energy generator is positioned in the tail unit.

21. The aircraft according to claim 1, wherein the rear part of the fuselage decreases in width toward the rear end of the fuselage.

22. The aircraft according to claim 1, wherein the single electrical energy generator comprises a gas turbine.

* * * * *